United States Patent [19]

Boucher

[11] Patent Number: 5,064,975

[45] Date of Patent: Nov. 12, 1991

[54] ELECTRICAL TRANSMISSION CONTROL MECHANISM

[75] Inventor: Val G. Boucher, Roanoke, Ill.

[73] Assignee: Caterpillar Inc., Peoria, Ill.

[21] Appl. No.: 579,756

[22] Filed: Sep. 10, 1990

[51] Int. Cl.[5] .............................................. H01H 9/06
[52] U.S. Cl. ................................................ 200/61.88
[58] Field of Search .................. 200/4, 11 DA, 61.27, 200/61.54, 11 J, 11 K, 61.88, 61.89, 61.91

[56] References Cited

U.S. PATENT DOCUMENTS

| | | | |
|---|---|---|---|
| 2,795,963 | 6/1937 | Alfieri | 74/334 |
| 3,242,758 | 3/1966 | Harris et al. | 74/476 |
| 3,613,480 | 10/1971 | Shull | 74/733 |
| 3,939,313 | 2/1976 | Hayashi et al. | 200/11 J |
| 4,158,404 | 6/1979 | Yamashita et al. | 192/3.58 |
| 4,334,130 | 6/1982 | Beig | 200/61.54 |
| 4,442,730 | 4/1984 | Snoy | 74/475 |
| 4,745,826 | 5/1988 | Nishikawa et al. | 74/866 |
| 4,798,099 | 1/1989 | Alexander et al. | 74/473 |
| 4,916,263 | 4/1990 | Ichigo | 200/11 DA |
| 4,930,366 | 6/1990 | Boucher et al. | 74/365 |

Primary Examiner—J. R. Scott
Attorney, Agent, or Firm—Charles E. Lancantin, Jr.; John W. Grant

[57] ABSTRACT

An electrical transmission control mechanism includes a first printed circuit board having a first plurality of contact elements thereon, and a second printed circuit board connected thereto and having a second plurality of contact elements thereon. A transmission control assembly includes a control member movable laterally and adapted to cause travel of a holder and a first plurality of wiper members linearly across the first plurality of contact elements for selecting the direction of rotation of a transmission, and movable longitudinally and adapted to cause rotation of a second holder and a second plurality of wiper members across the second plurality of contact elements. A third printed circuit board is preferably mounted in parallel relation to the second printed circuit board and at a right angle to the first printed circuit board when a substantial number of gear ratios are used.

20 Claims, 7 Drawing Sheets

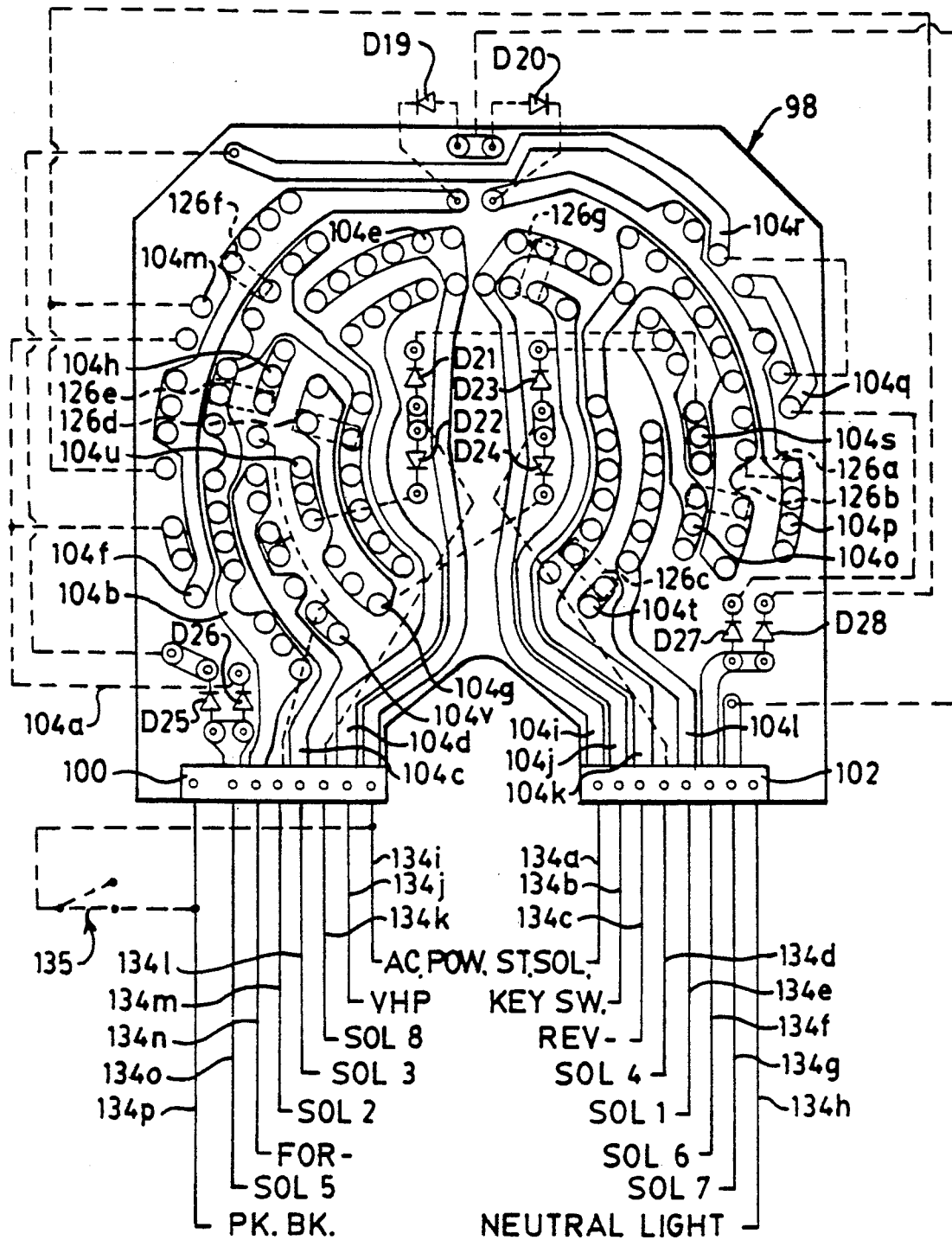

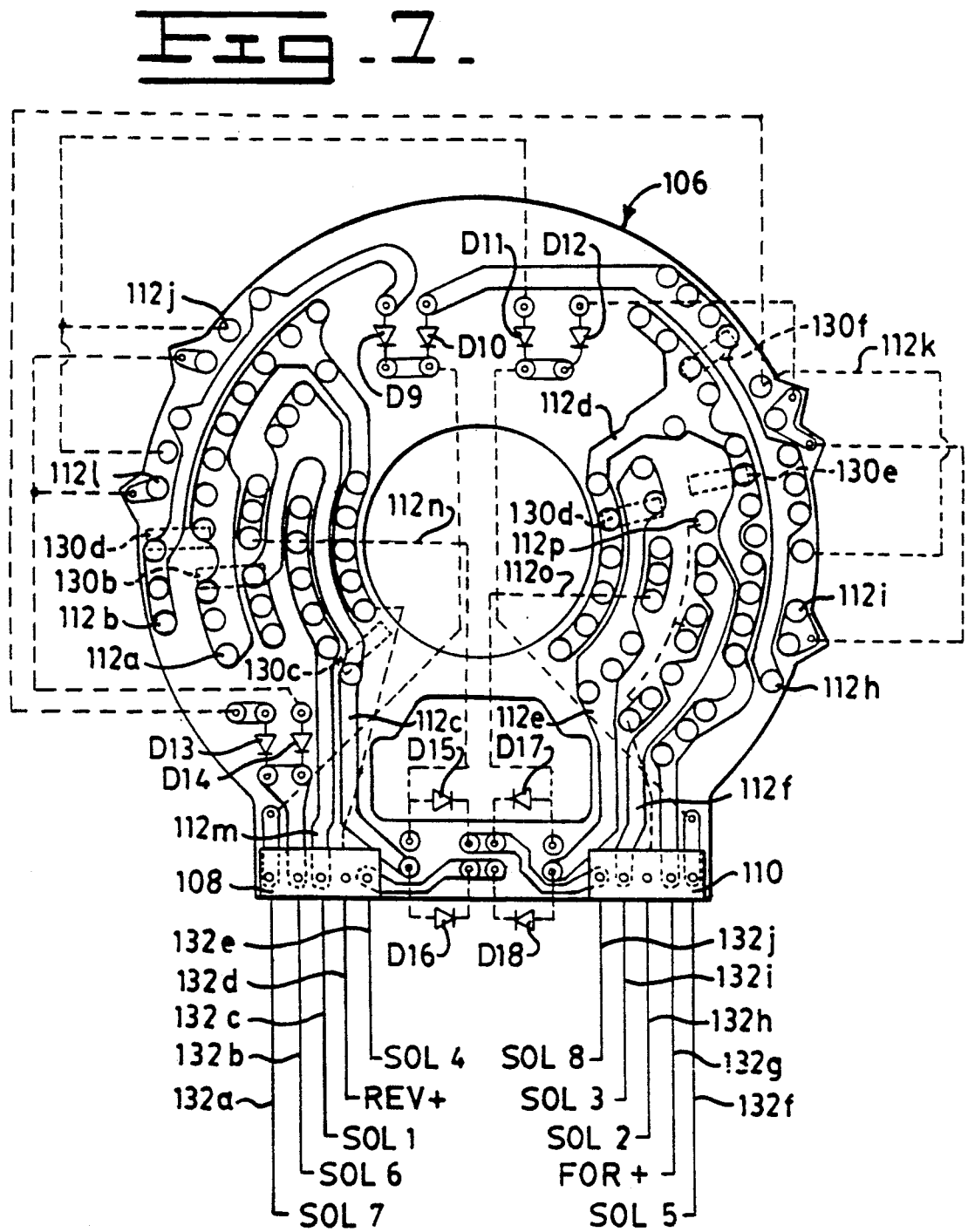

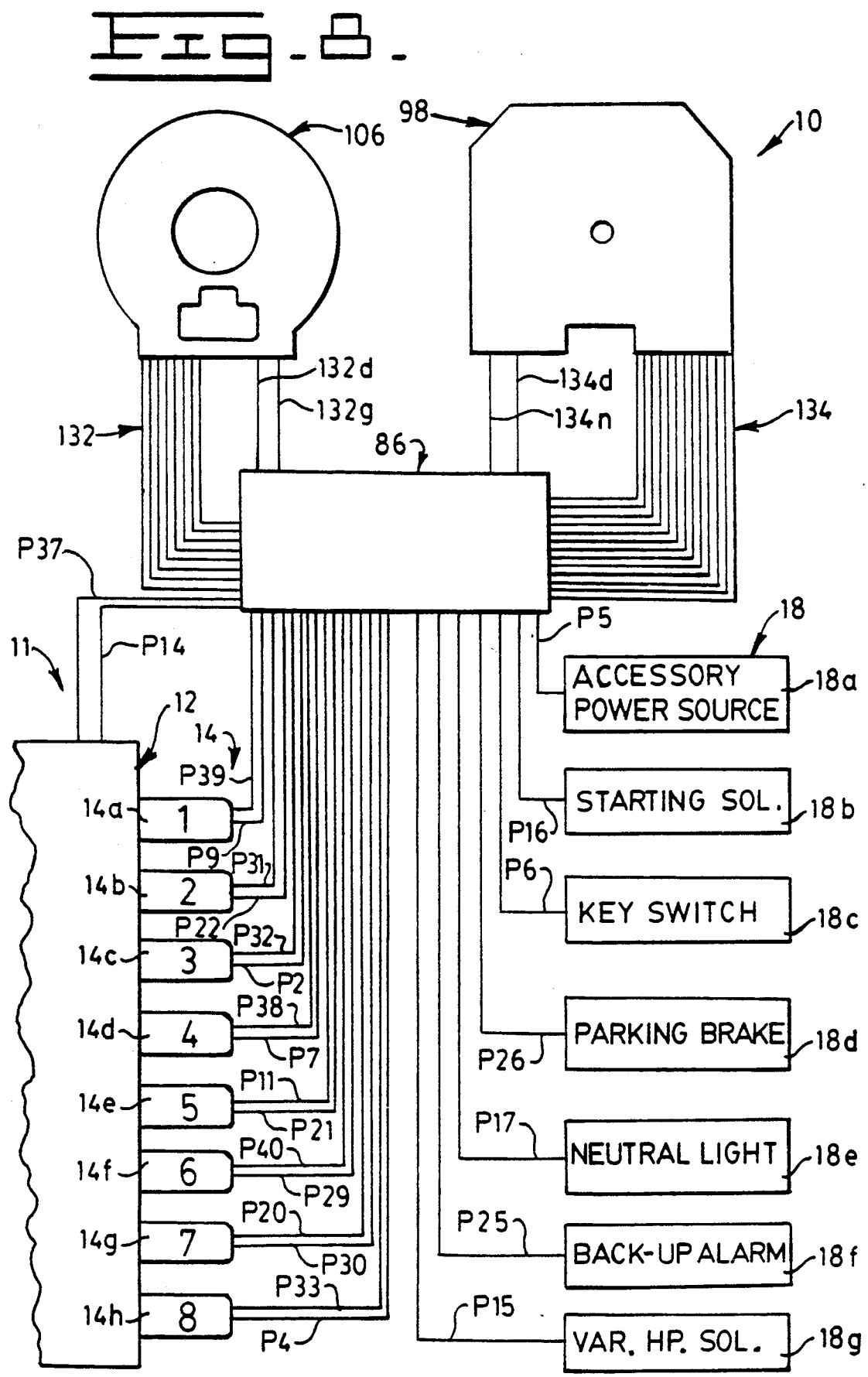

1

ELECTRICAL TRANSMISSION CONTROL MECHANISM

DESCRIPTION

1. Technical Field

This invention relates generally to an electrical transmission control mechanism for controlling the operation of a reversible, multispeed transmission of a vehicle or the like, and more particularly to a manually operated transmission control assembly and a plurality of related electrical electrically actuated actuators associated with the transmission.

2. Background Art

Earthmoving equipment operators throughout v the world are familiar with mechanical-over-hydraulic single lever transmission control assemblies operable in an inverted U-shaped guide slot formed in an upper control panel for shifting a powershift transmission. Typically, the operator's and can manipulate an upstanding control member in one leg of the inverted U-shaped slot for selecting one of a plurality of forward speeds, in the other leg for selecting one of a plurality of reverse speeds, and in the forwardly located base portion of the slot for obtaining a neutral mode. A branch leg off the base portion is occasionally used for a parking mode wherein the neutral mode is combined with the application of a parking brake in the drive train.

Safety interlocks are often incorporated in these control assemblies. For example, a separate safety lever can be pivoted into a position mechanically locking the transmission control member in neutral when the engine of the vehicle is idling and/or when the vehicle is not being actively used. In addition, these systems are so designed that the vehicle cannot be started unless the transmission control member is in neutral and/or that the vehicle cannot move if the engine is started with the control member disposed in a gear unless the control member is manually returned first to the neutral portion of the guide slot.

Most of these control assemblies incorporate complex mechanical linkage systems for moving hydraulic control valve spools and thereby selecting the desired speed and directional control functions. Such complexities can be appreciated by reference to the structure shown in U.S. Pat. No. 3,242,758 issued on Mar. 29, 1966 to K. J. Harris, et al.

The aforementioned primarily all-mechanical transmission control assemblies are complex and costly, difficult to accurately adjust the mechanical elements, and must be specifically tailored to the space requirements and distances between major components of different vehicles.

U.S. Pat. No. 4,930,366 issued on June 5, 1990 to V. G. Boucher, et al discloses an electrical transmission control mechanism having first and second control members which are individually rotatable for selecting the directional and neutral modes or the gear ratio steps of the transmission. First and second electrical rotary type switching devices responsive to the movement of those control members are advantageously used to disconnect and connect both the electrical power side leads and the ground side leads of a plurality of electromagnetic actuators or clutch actuating solenoids in order to minimize the possibility of any inadvertent electrical short causing improper or unexpected operation of the transmission. Each of the rotary switching devices has a plurality of upstanding contact elements and a plurality of wiper members that make selected contact with pairs of the contact elements to provide the desired operating functions. Moreover, in that mechanism a plurality of surge-protecting diodes are individually electrically connected between the supply and ground side leads of the clutch actuating solenoids. The purpose of these diodes is to suppress the voltage spikes caused by the disengagement of each solenoid by communicating any surge in voltage in the positive supply lead to the ground side lead at the preselected setting of the diode. Thus, U.S. Pat. No. 4,930,366 incorporates a number of desirable features.

What is needed is an electrical transmission control mechanism including a transmission control assembly that can be manually manipulated in the well known basic U-shaped pattern by a vehicle operator, and that can convert such motions to the actuation of a plurality of dependable wiper-type electrical switches in an effective and economical manner. Preferably, the control mechanism should incorporate at least some of the desirable features set forth in U.S. Pat. No. 4,930,366 and mentioned above. Moreover, the control mechanism should be adaptable to a transmission having either a low number or a substantial number of operating speeds in both forward and reverse, and provide for the various neutralizing, parking and safety functions noted above and for the operation of a plurality of auxiliary components such as a back-up alarm, a display panel, or the like. The control mechanism should position the electrical components close to the actuating control member and in a sealed housing, while providing for convenient serviceability of the electrical components in the event of any malfunction thereof.

The present invention is directed to overcoming one or more of the problems as set forth above.

DISCLOSURE OF THE INVENTION

According to one aspect of the present invention an electrical transmission control mechanism includes a plurality of electrical actuators for selecting the direction of rotation and the gear ratio of a transmission, a transmission control assembly having a control member with an outer end portion, and a support for mounting the control member for pivotal movement about an axis and for transverse movement of the outer end portion. Also included are a printed circuit board having a plurality of contact elements thereon that are electrically connected to a power source and the actuators, a wiper assembly having a plurality of wiper members connected thereto, and guide means for supporting the wiper assembly for linear travel transversely across the printed circuit board in response to transverse movement of the outer end portion of the control member and for thereby selecting the direction of rotation of the transmission.

In accordance with another aspect of the invention an electrical transmission control mechanism includes a plurality of actuators for selecting the direction of rotation of a transmission, a transmission control assembly having a control member, and a support for mounting the control member for pivotal movement about a transverse axis and for transverse movement relative to the operator. Further included are printed circuit board means for engaging selected ones of the actuators and having a plurality of contact elements connected to an electrical power source and an electrical ground, first wiper means for bridging selected ones of the contact elements in response to transverse travel of the control member and selecting the direction of rotation of the transmission, and second wiper means for bridging other selected ones of the contact elements in response to pivotal movement of the control member about the axis and selecting the desired gear ratio of the transmission.

In a still further aspect of the invention an electrical transmission control mechanism includes a plurality of solenoids for selecting one of a plurality of gear ratios and the direction of rotation of a transmission, an electrical power source, a transmission control assembly including a control member having outer and inner end portions, and support means for mounting the control member for limited rotation about a first axis and for limited pivotal movement about a second axis disposed generally transverse to the first axis. Moreover, the electrical transmission control mechanism includes a first means for selecting one of the gear ratios by communicating power to selected ones of the solenoids in response to rotation of the control member about the first axis, and a second means for communicating the power source selectively to the first means and for selecting the direction of rotation of the transmission in response to movement of the inner end portion of the control member about the second axis.

Advantageously, the transverse travel of the inner end of the manually operated control member results in the linear travel of a wiper assembly across a first printed circuit board, while the rotation of the control member about a central axis is adapted to cause rotation of other contact wiping members about another printed circuit board disposed in a right angle relationship to the first printed circuit board. The electrical wiper portion of the mechanism is beneficially contained in a sealed housing located adjacent the control member, and can be easily serviced.

BRIEF DESCRIPTION OF THE DRAWINGS

FIG. 6 is an elevational view of the second printed circuit board as taken along line 6—6 of FIG. 3 showing diagrammatically certain electrical connections in broken lines;

FIG. 7 is an elevational view of the third printed circuit board as taken along line 7—7 of FIG. 3 showing diagrammatically other electrical connections in broken lines; and FIG. 8 is an overall diagrammatic view showing the basic relationships between the major elements of the electrical transmission control mechanism of the present invention in block-outline form.

BEST MODE FOR CARRYING OUT THE INVENTION

Figure 1:
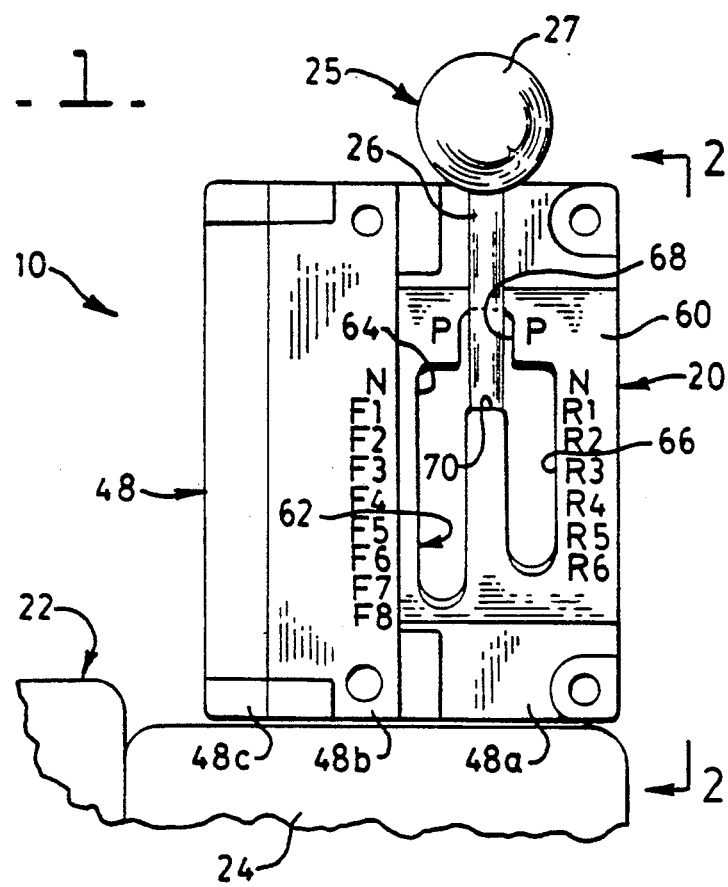
FIG. 1 is a top plan view of the electrical transmission control mechanism of one embodiment of the present invention, as positioned forwardly of an operator seat's right arm rest.
Figure 2:
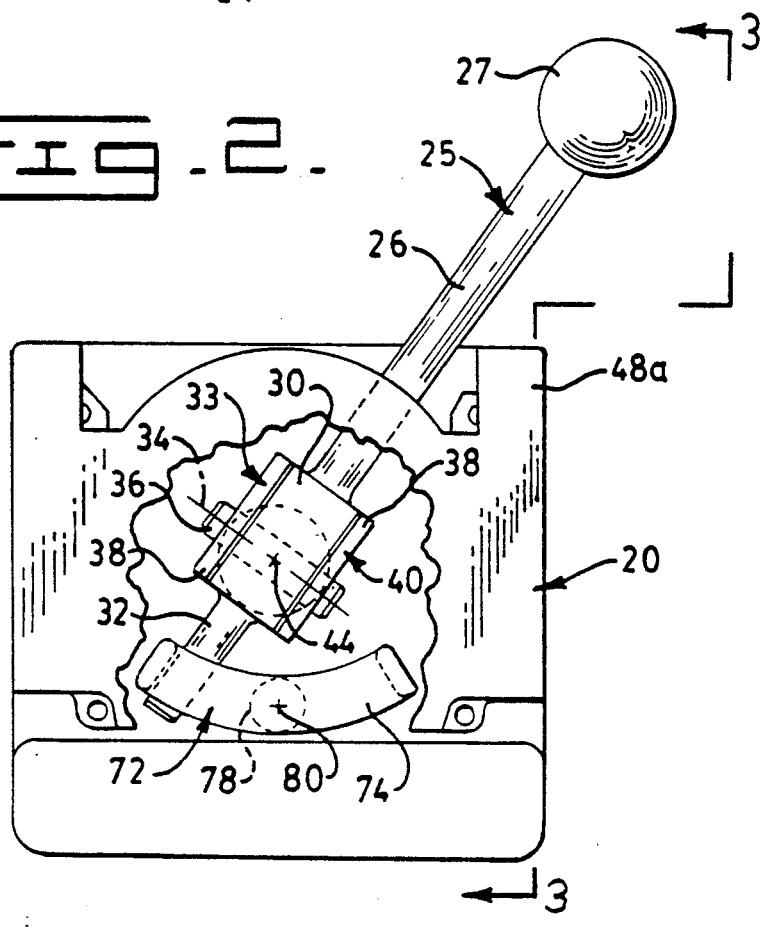
FIG. 2 is a right side elevational view of the electrical transmission control mechanism of FIG. 1 with a portion broken open to illustrate certain mechanical features thereof.

An electrical transmission control mechanism 10 is shown in FIGS. 1 and 8 including an electrical actuator means 11 for shifting a conventional power shift transmission 12 into one of a plurality of forward or reverse gear ratios or operating speeds and for controllably moving a vehicle such as an earthmoving tractor, motor grader, or the like. Although not shown, these transmissions typically include a plurality of hydraulically actuated disc-type clutches or brakes, and can be of the countershaft gear train form or the planetary gear train form, or combinations thereof. In this instance the electrical actuator means 11 includes a plurality of electromagnetic actuators or clutch-actuating solenoids 14a–14h for operating selected ones of such clutches or brakes, as well as operating a plurality of auxiliary components 18a–18g.

As is shown in FIGS. 1–4, the control mechanism 10 includes a transmission control assembly 20 located near an operator's seat 22 and preferably immediately forwardly of a right arm rest 24 thereof. The control assembly 20 has a single actuator or control member 25 having an outer end portion or upper rod 26 including a knob 27, a block-shaped body portion 30, and an inner end portion or lower rod 32 arranged in serial relation. A support means 33 is provided for mounting the control member 25 in such a manner that the lower rod 32 will move laterally in response to lateral or left to right movement of the knob 27 when viewing FIG. 1, and will move longitudinally in response to longitudinal or forward to rearward movement thereof. Specifically, the support means 33 mounts the body portion 30 for limited rotational movement about an axis 34 of a pivot pin 36 extending between a pair of arms 38 of a pivotable yoke 40. The supporting yoke 40 has a stepped cylindrical shaft 42 mounted for rotation about a transverse horizontal axis 44 in a cylindrical bore 46 formed in a separable three-piece housing assembly 48. As is shown best in FIG. 4, the shaft 42 has a formed inner end 50 of a pentagonal cross section with a hole 52 therethrough transverse to the axis, and a bow-tie-shaped holder 54 is releasably mounted on the formed inner end 50 and retained in place by a retaining pin 56 extending through the hole 52 and seated in a cross slot 58 formed in the holder. The holder 54 is preferably made of a non-conducting plastic material.

Figure 3:
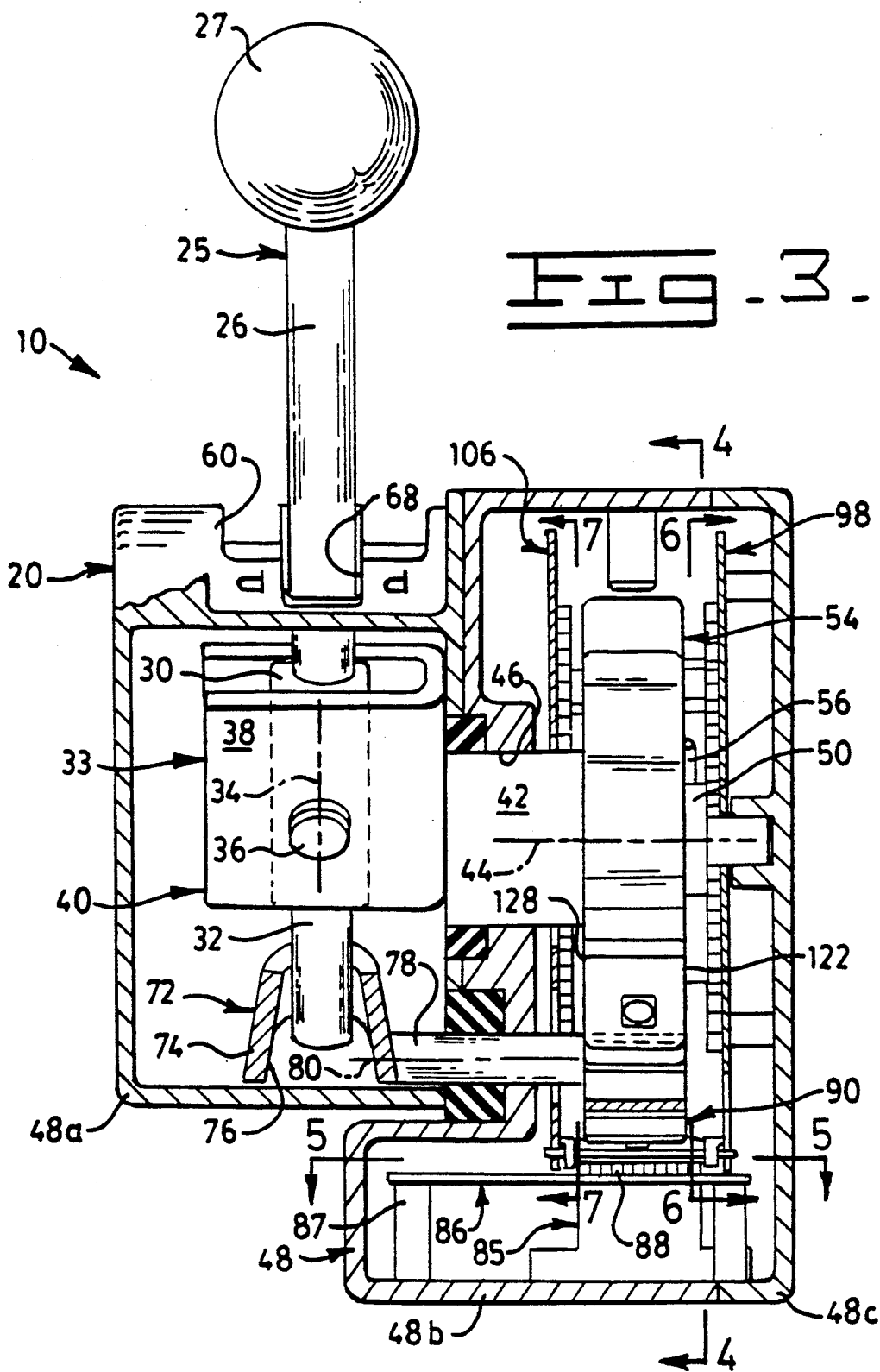
FIG. 3 is a front elevational view of the transmission control assembly shown in FIGS. 1 and 2, with the front portion of the housing assembly broken away to better show the relationship of certain mechanical elements to each other and to show three printed circuit boards contained therein.
Figure 4:
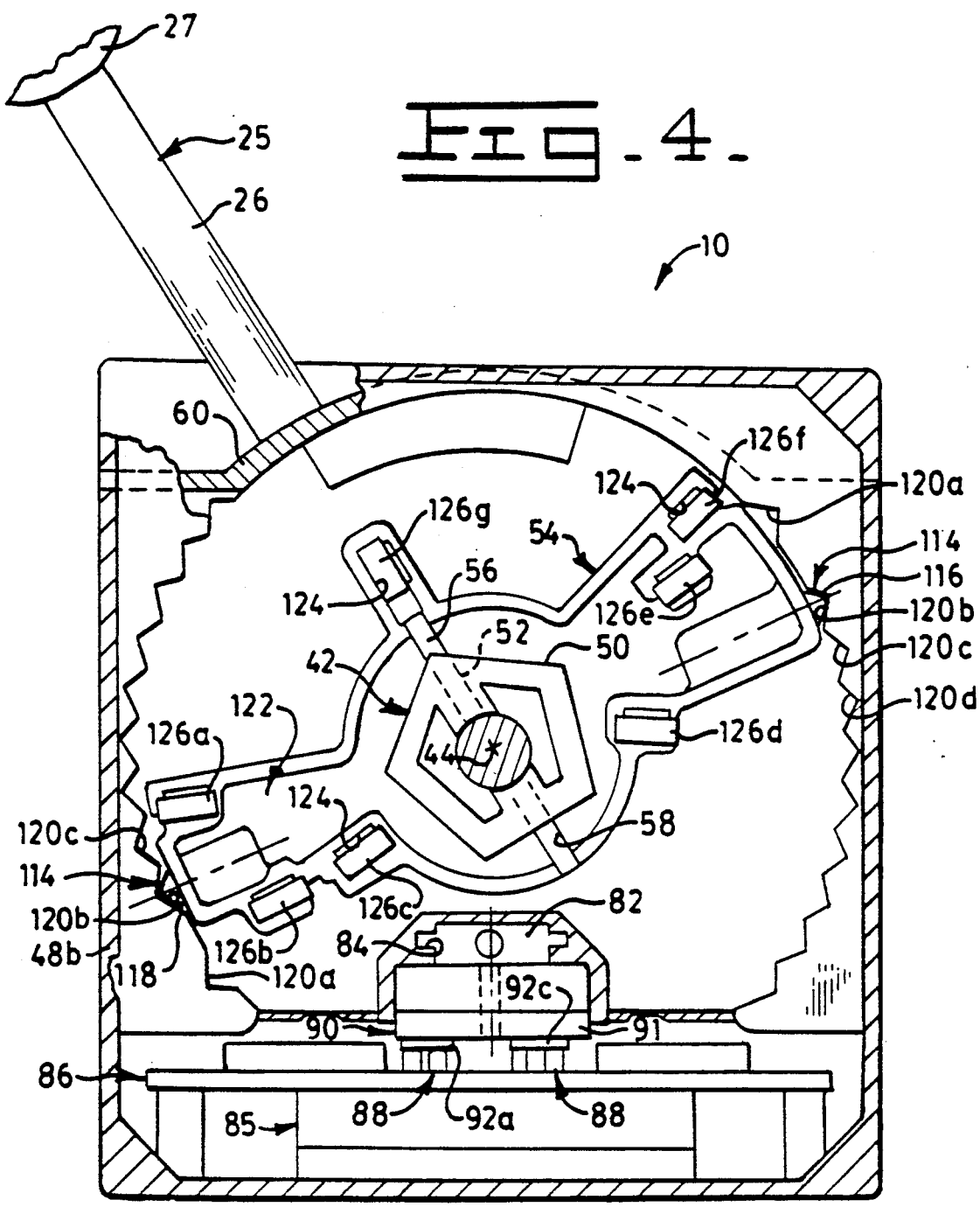
FIG. 4 is a sectional view of the transmission control assembly as taken along line 4—4 of FIG. 3.

As can be seen in FIGS. 3 and 4, the housing assembly 48 has an outside case 48a toward the right of the vehicle operator, a central case 48b, and an inside case or end cap 48c adjacent the operator. The outside case 48a has a recessed top wall 60 shaped as a segment of a cylindrical tube having a preselected radius from the transverse axis 44. The shaped top wall 60 has a profiled guide slot 62 therein as shown best in FIG. 1 including a longitudinally oriented forward leg 64, a reverse leg 66 parallel thereto, a forwardly disposed parking leg 68 parallel thereto and located between the planes thereof, and a neutral cross passage 70 interconnecting them.

The travel range of the upper rod 26 of the control member 25 is thus limited by the guide slot 62, and the lower rod 32 is forced to travel in substantially the same basic pattern. A lost-motion coupling 72 is operatively associated with the lower rod 32 and includes an elongate ring 74 defining a generally longitudinally oriented recess 76 that is relatively narrow in the transverse direction to receive the lower rod with minimal clearance. The ring 74 is integrally connected to a support shaft 78 having another transverse axis 80 located vertically below the transverse axis 44. Referring to the lower portion of FIG. 4, the inside end of support shaft 78 is provided with a flanged guide block 82 that is received in a transversely oriented guiding slot 84 formed in the central case 48b. Consequently, the support shaft 78 and guide block 82 are adapted to travel transversely without rotation and in a horizontal attitude with transverse movement of the lower rod 32 of the control member 25.

Figure 5:
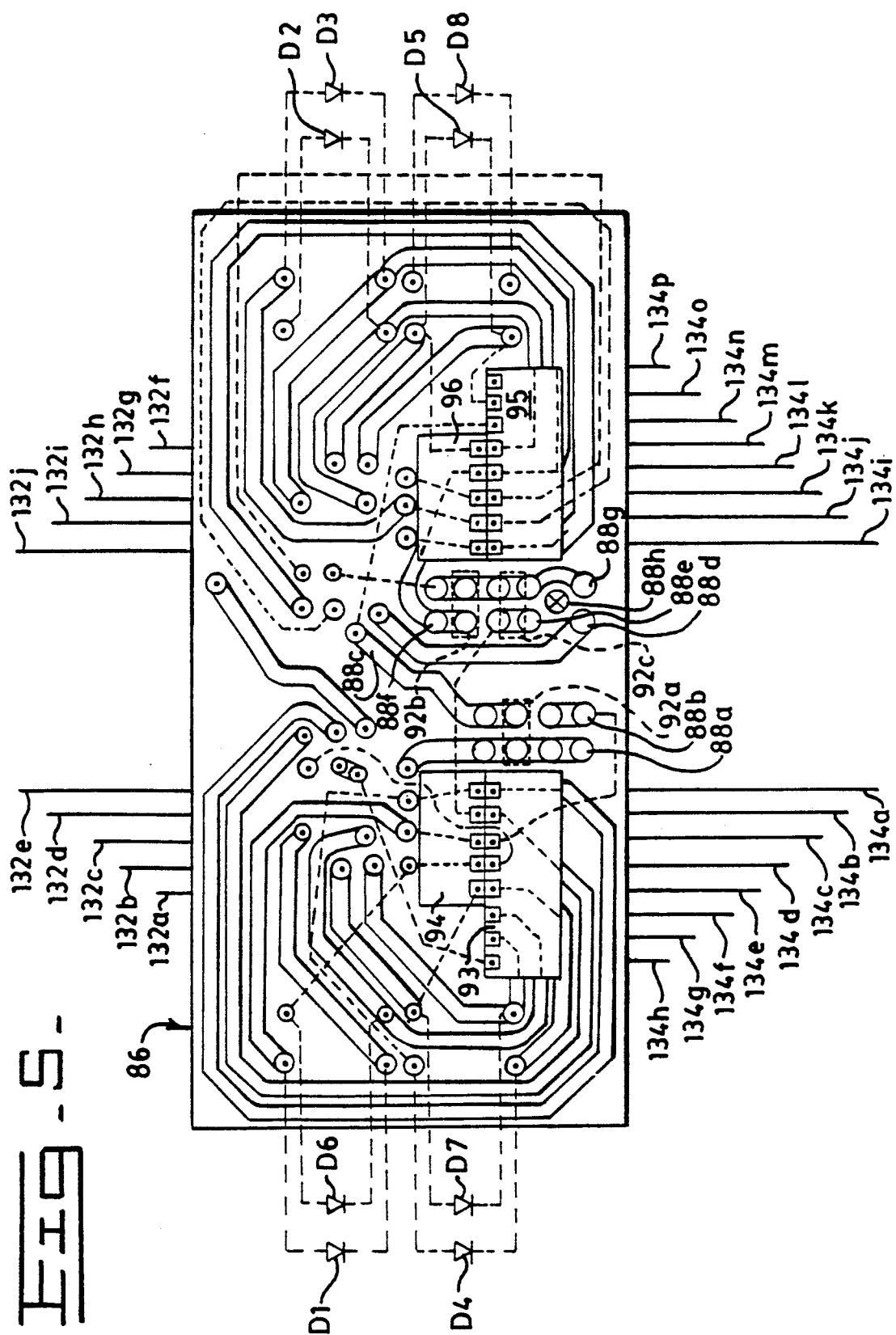
FIG. 5 is a top plan view of the first printed circuit board as taken along line 5—5 of FIG. 3 with certain electrical connections illustrated in broken or phantom lines.

Referring to FIGS. 3-5, the electrical transmission control mechanism 10 includes a base or and a horizontal, first printed circuit board 86 supported on a plurality of upstanding pedestals 87 extending from the central case 48b. In the instant embodiment the base connector has four rows of 10 pins, 25 pins or electrical lines of which are used and 15 of which are not used. The 25 lines are connected to the first printed circuit board 86 and extend externally to certain components and these are identified by the nomenclature series P2-P40 as is illustrated in FIG. 8. Specifically, these connecting lines are identified as follows:

P2 = Solenoid 3 return
P4 = Solenoid 8 return
P5 = Accessory power
P6 = Key switch
P7 = Solenoid 4 return
P9 = Solenoid 1 return
P11 = Solenoid 5
P14 = Transmission power
P15 = Variable horsepower solenoid
P16 = Start solenoid or relay
P17 = Neutral light
P20 = Solenoid 7
P21 = Solenoid 5 return
P22 = Solenoid 2 return
P25 = backup alarm
P26 = parking brake
P29 = Solenoid 6 return
P30 = Solenoid 7 return
P31 = Solenoid 2
P32 = Solenoid 3
P33 = Solenoid 8
P37 = Transmission ground
P38 = Solenoid 4
P39 = Solenoid 1
P40 = Solenoid 6

The first printed circuit board 86 has a plurality of upstanding cylindrical contact elements identified generally by the numeral 88 as is shown in FIG. 5. Most of these contact elements, and similar contact elements to be described later, are electrically connected together by the usual conducting strips in preselected rows or groups, so that a single reference number can hereinafter be applied to one group or to an independent one thereof. Many of these conducting strips or electrical lines are located on the opposite side of the printed circuit board to the side illustrated, and are diagrammatically indicated by broken lines. For example, the contact elements 88a consist of four individual contact elements connected to the transmission ground line P37 and arranged in a first row as is shown, and each of the contact elements 88b and 88c consist of two upstanding contact elements electrically connected together and which are spaced apart in a second row. A third row consists of a single contact element 88d, and double contact elements 88e and 88f; and a fourth row consists of five contact elements 88g connected to the transmission power line P14. A representative dummy contact element 88h is also provided for wiper spanning purposes. Eight surge-protecting diodes identified by the series designation D1 to D8 are secured to this board in a spanning relationship between the positive and ground side leads of the respective solenoids 14a-14h.

As shown in FIG. 4 a three-position, power-directing wiper assembly 90 is releasably secured to the underside of the guide block 82 and travels transversely with it with lateral movement of the control member 25. The wiper assembly 90 includes a holder 91 made of a non-conducting plastic material and first, second and third wiper members or slide bars 92a, 92b and 92c of brass or similar conductive material mounted therein as is respectively indicated in broken rectangular outline form in FIG. 5. The first wiper member 92a longitudinally bridges the first and second rows, and the second and third wiper members 92b and 92c longitudinally bridge the third and fourth rows of the contact elements 88. Each of these wiper members is spring-loaded downwardly by a compression spring, not illustrated. Also, an eight socket connector 93 and a five socket connector 94 are secured to the circuit board 86 in back-to-back relation at one side of the contact elements 88, and another eight socket connector 95 and five socket connector 96 are similarly mounted on the circuit board at the opposite side of the contact elements.

Referring next to FIGS. 3 and 6, a second printed circuit board 98 is mechanically and electrically coupled to the lower, first printed circuit board 86 by two eight pin connectors 100 and 102 secured in horizontal alignment to the board and which are telescopically received in the eight socket connectors 95 and 93 respectively. The second printed circuit board 98 is releasably secured to the end cap 48c and is arranged in a longitudinal vertical plane, and includes a plurality of cylindrical contact elements identified generally by the reference number 104 that extend laterally outwardly from the board in preselected groups in a horizontal manner. Ten current blocking diodes identified by the series D9 through D18 are secured to this board for purposes that will be later explained.

Similarly, as is shown in FIGS. 3 and 7, a third printed circuit board 106 is mechanically and electrically coupled to the lower, first printed circuit board 86 by two five pin connectors 108 and 110 fixedly secured to the third printed circuit board and telescopically received in the five socket connectors 94 and 96 respectively. The third printed circuit board 106 is also arranged in a longitudinal vertical plane and includes a plurality of cylindrical contact elements identified generally by the reference number 112 that extend laterally inwardly in a horizontal manner in a plurality of preselected groups. Ten more current blocking diodes identified by the series D19 through D28 are secured to the third printed circuit board. These diodes and contact elements will be explained later. In order to simplify the drawings, a plurality of other dummy contact elements which have no electrical circuits or lines associated therewith have not been shown on the second and third circuit boards; these dummy contact elements merely support the wiper elements as they are rotated into the active positions.

Attention is now directed to holder 54 shown in FIG. 4, and particularly to indexing means 114 associated therewith for precisely angularly positioning the holder 54 about axis 44, and with respect to the central case 48b, in response to longitudinal movement of the upper rod 26 of the control member 25. Such indexing means includes a pair of oppositely extending, round nosed detent elements 116 and 118 that are suitably seated or guided in the periphery of the holder and are spring-loaded to extend radially outwardly therefrom. The detent elements are adapted to engage selected ones of a plurality of stationary detent grooves 120a, 120b, 120c, 120d etc. arranged in this embodiment diametrically opposite to each other in two groups. For example, the control member 25 is precisely positioned in NEUTRAL as shown in the drawings by the placement of the detent elements 116 and 118 in the opposite v-shaped grooves 120b. When the holder 54 is rotated about the axis 44 for approximately 16 degrees in the counterclockwise direction when viewing FIG. 4, the detent elements will be seated in the grooves 120a for obtaining the PARKING mode, and when the holder is rotated about 8 degrees in the clockwise direction from NEUTRAL the detent elements are seated in the grooves 120C for obtaining FIRST SPEED in either the forward or reverse direction. The remaining grooves are equally angularly spaced apart at about 8 degrees and correspond to the remaining speed increasing gear ratio positions, SECOND SPEED to EIGHTH SPEED, of the transmission 12.

As shown in FIG. 4, the holder 54 has an inwardly facing, and contoured side surface 122 provided with seven pockets as is representatively indicated by the reference number 124. These pockets receive spring-loaded brass wiper members 126a-126g as is indicated in solid lines in FIG. 4 and in broken lines in FIG. 6. As the holder is rotated these seven wiper members make sweeping electrical contact with selected ones of the contact members 104 of the second printed circuit board 98. Although not specifically illustrated, an outwardly facing side surface 128 of the holder 54 is provided with six pockets to receive six brass wiper members 130a-130f which are also spring-loaded against selected pairs of the contact members 112 of the third printed circuit board 106 as is indicated by the broken line rectangles shown in FIG. 7.

It can be appreciated by reference to FIGS. 3, 5 and 6 that the eight pin connectors 100 and 102 of the vertical second printed circuit board 98 can be conveniently horizontally coupled to the eight socket connectors 95 and 93 of the horizontal first printed circuit board 86. Likewise, the five pin connectors 108 and 110 of the vertical third printed circuit board 106 can be easily horizontally coupled to the five socket connectors 94 and 96 of the first printed circuit board as may be noted by reference to FIGS. 3, 5 and 7. Thus, ten electrical lines 132a-132j electrically couple the printed circuit boards 86 and 106, and sixteen electrical lines 134a-134p electrically couple the printed circuit boards 86 and 98. Also, a normally closed parking brake switch 135 is mounted on the second board 98, and as is shown at the lower left portion of FIG. 6 this switch is electrically connected to lines 134i and 134p. The operation of this switch will be described later.

As is shown in FIG. 8, the horizontal first printed circuit board 86 has electrically associated therewith twenty five electrical lines, identified by the reference numbers within the series P2 to P40, that are connected to the transmission 12, the solenoids 14a-14h, and the auxiliary components 18a-18g as mentioned previously. The solenoids 14a-14h correspond to Solenoid Nos. 1 through 8. The auxiliary components are shown as diagrammatic boxes and are individually identified as follows:

18a - accessory power source
18b - starting solenoid or relay
18c - key switch
18d - parking brake solenoid or broadly parking brake
18e - NEUTRAL light
18f - back-up alarm
18g - variable horsepower solenoid Industrial Applicability In the NEUTRAL and laterally centered position of the control member 25 shown in the drawings, the lower rod 32 of the control member 25 has positioned the ring 74, the shaft 78 and the power directing wiper assembly 90 of FIG. 3 in the laterally centered position also. The wiper assembly 90 thereby places the wiper members or slide bars 92a, 92b and 92c in the positions illustrated by broken rectangular blocks in FIG. 5. The wiper members are spring loaded downwardly against the contact elements 88 of the first printed circuit board 86. Wiper member 92a electrically couples the contact elements 88a, which are coupled directly to ground line P37 of FIG. 8, to the contact elements 88c. Contact elements 88c are electrically connected to FOR—or return line 134n. This grounds contact elements 104b in FIG. 6. Wiper member 92b in FIG. 5 electrically couples contact elements 88f to contact elements 88g which are directly connected to the source of electrical power in the transmission power line P14 of FIG. 8. And, wiper member 92c electrically couples contact elements 88e to the same powered contact elements 88g. This is effective to direct sufficient current through lines P38 and P20, and to simultaneously positively ground lines P7 and P30, to the fourth solenoid 14d and seventh solenoid 14g respectively to activate them as can be appreciated by reference to FIG. 8.

More specifically, in the NEUTRAL position of the wiper member 92b, electrical power (FOR +) is available in the first board 86 at the contact elements 88f and the line 132g. Line 132g extends through connector 96 and connector 110 shown in FIG. 7 and to the grouped contact elements 112d of the third board 106. Wiper member 130d electrically bridges contact elements 112d with contact elements 112e, allowing current to flow through diode D18 to line 132e and back to the fist board 86 of FIG. 5 and to line P38 leading to Solenoid No. 4, or to reference 14d of FIG. 8. Simultaneously, wiper member 130f shown in FIG. 7 allows current flow from contact elements 112d to contact elements 112h, and through diode D10 to line 132a through connectors 102 and 93 back to the first board 86 and to line P20 leading to Solenoid No. 7, or to reference 14g of FIG. 8.

In NEUTRAL wiper member 92c shown in FIG. 5 electrically couples powered contact elements 88g to contact elements 88e which are connected to line 132d through coupled connectors 94 and 108. Line 132d extends to the third board 106 of FIG. 7 and is electrically connected to contact elements 112a. Wiper member 130a thereupon electrically bridges power to contact elements 112b and allows current to flow through diode D9 to line 132a leading to Solenoid No. 7 in a parallel path to that described above. Wiper member 130b electrically bridges power to contact elements 112c and allows current to flow through diode D16 to line 132e and Solenoid No. 4 in a parallel path to that previously described.

In NEUTRAL wiper member 92a shown in FIG. 5 serves as the grounding device for solenoid Nos. 4 and 7 by grounding contact elements 88c and return line 134n extending to the second board 98 of FIG. 6. Contact elements 104b are connected to return line 134n (FOR—), allowing wiper member 126e to ground the contact elements 104h electrically coupled to connector 102 and the line 134h. Line 134h is directed to the first board 86 of FIG. 5 and to line P17 of FIG. 8 to allow a neutral indicator light 18e to be applied at the operators station of the vehicle. Wiper member 126f of FIG. 6 also bridges the contact elements 104f to the contact elements 104b. Line 134g is subsequently grounded through diode D19 to contact elements 104f. Line 134g leads back to the first board 86 and to Solenoid No. 7 via line P30 of FIG. 8. In FIG. 6 wiper member 126d serves to ground contact elements 104g, which are connected to line 134d through diode D24. Line 134d extends back to the first board 86 of FIG. 5 and to Solenoid No. 4 via line P7 of FIG. 8.

In NEUTRAL wiper member 126g of FIG. 6 electrically couples contact elements 104i and 104j, and since these elements are connected to lines 134a and 134b respectively the starting solenoid 18b and key switch 18c shown in FIG. 8 are electrically connected via lines P16 and P6. This permits the engine of the vehicle to be started. In the instant embodiment the engine can also be started in the forward PARK position of the control member 25, but in all other positions of the control member 25 the wiper member 126g is rotated away from a bridging relationship between contact elements 104i and 104j. Consequently, the engine cannot be started if the control member is placed in any speed position, and this prevents inadvertent movement of the vehicle when starting.

The electrical transmission control mechanism 10 not only actuates preselected combinations of two or three of the solenoids 14a-h, but also is effective to achieve the following five functions:

A. Neutral start
B. Backup alarm
C. Parking brake
D. Variable horsepower
E. Neutral indicator light The following logic table relates the sixteen positions of the control member 25 in the guide slot 62 to these five functions, and to the engaged ones of transmission Solenoid Nos. 1-8 for the various positions and/or gear ratios:

| Gear | Solenoids Energized | Functions |
|---|---|---|
| PARK | 4 & 7 | A & E |
| NEUTRAL | 4 & 7 | A, C & E |
| FWD-1 | 2, 6 & 8 | C |
| FWD-2 | 3, 5 & 8 | C |
| FWD-3 | 3, 7 & 8 | C |
| FWD-4 | 2, 7 & 8 | C & D |
| FWD-5 | 2, 4 & 6 | C & D |
| FWD-6 | 3, 4 & 5 | C & D |
| FWD-7 | 2, 4 & 5 | C & D |
| FWD-8 | 2, 4 & 7 | C & D |
| REV-1 | 1, 6 & 8 | B & C |
| REV-2 | 1, 5 & 8 | B & C |
| REV-3 | 1, 7 & 8 | B & C |
| REV-4 | 1, 4 & 6 | B, C & D |
| REV-5 | 1, 4 & 5 | B, C & D |
| REV-6 | 1, 4 & 7 | B, C & D |

Assuming next that the operator positions the control member 25 laterally inwardly into the forward leg 64 of the guide slot 62 in FIG. 1, and rearwardly into the FIRST FORWARD (F1) gear ratio position. This causes the lower rod 32 to react against the coupling 72 to move support shaft 78, the guide block 82 and the power directing wiper assembly 90 toward the outside, or to the left when viewing FIG. 3. This motion moves all three of the wiper members 92a, and 92b and 92c upwardly when viewing FIG. 5 from the positions illustrated. Both of the wiper members 92a and 92c couple electrical power from the line P14 and the contact elements 88g to contact elements 88f, and from there by conducting strip to connector 96 and the line 134g (FOR +). Line 134g is connected to contact elements 112d on the right side of FIG. 7, and all of the wiper members are moved away from the NEUTRAL positions illustrated by approximately 8 degrees in a clockwise direction. Wiper member 130d shown in FIG. 7 connects FOR + power to contact elements 112o and through diode D17 to line 132j, from line 132j back to the first board 86 and to line P33 extending to Solenoid No. 8. One-way current blocking diode D15 blocks power flow to contact elements 112n. Wiper member 130e connects FOR + power from contact elements 112d to contact elements 112p and to line 132h, and line 132h extends back to the first board to line P31 and the Solenoid No. 2. Wiper member 130f connects FOR + power from contact elements 112d to contact elements 112k and through diode D13 to line 132b, from line 132b back to the first board 86 and the line P40 leading to Solenoid No. 6. Diode D14 prevents power flow to contact elements 1121.

On the ground side in FIRST FORWARD, wiper member 92a of FIG. 5 connects the contact elements 88a and the transmission ground line P37 to contact elements 88c and the line 134n (FOR —) which is the current return line. The wiper members 126 shown in FIG. 6 are repositioned approximately 8 degrees in a counterclockwise direction from NEUTRAL, and the line 134n is connected to contact elements 104b such that wiper member 126e is disposed in a position to bridge therefrom to contact elements 104v. This grounds the live 134m leading back to the first board 86 of FIG. 5, and consequently grounds the ground side line P22 leading to Solenoid No. 2. In FIG. 6 the wiper member 126f is positioned to bridge the grounded contact elements 104b with the contact elements 104m electrically connected to diode D28. The return line 134f leading back to first board 86 of FIG. 5 subsequently provides a ground path back to line P29 and the Solenoid No. 6. Wiper member 126d shown in FIG. 6 bridges grounded contact elements 104b with contact elements 104u electrically connected to diode D22. Diode 22 is connected to line 134k connected to the first board 86 of FIG. 5, so that line P4 of the Solenoid No. 8 is grounded. The four wiper members 126a, 126b, 126c and 126g located at the right side of FIG. 6 are inactive.

Thus, by shifting from NEUTRAL to FIRST FORWARD the three power lines P31, P40 and P33 shown in FIG. 8 were positively connected, and the three ground lines P22, P29 and P4 were positively connected to actuate Solenoid Nos. 2, 6 and 8 respectively.

It is next assumed that the vehicle operator shifts the control member 25 of FIG. 1 forwardly, laterally to the right, and rearwardly into the FIRST REVERSE (R1) position of the guide slot 62. This positions the wiper members 92a, 92b and 92c downwardly from the positions illustrated when viewing FIG. 5. Whereupon wiper member 92b connects the contact elements 88g that are connected to transmission power line P14 to contact element 88e which provides power (REV +) to line 132d leading to the third board 106 of FIG. 7. The wiper members shown in FIG. 7 are repositioned one incremental angular distance in a clockwise direction from the NEUTRAL position illustrated, and to the same locations described above with respect to FIRST FORWARD. Accordingly, wiper member 130a is moved upwardly to bridge and couple REV+ power from line 132d and the contact elements 112a to contact elements 112l connected to diode D14, and therethrough to line 132b to the first board 86 of FIG. 5 and to line P40 extending to Solenoid No. 6 of FIG. 8. Wiper member 130b of FIG. 7 connects powered contact elements 112a to contact elements 112n connected to diode D15, and through diode D15 to line 132j to the first board 86 of FIG. 5 and to line P33 of Solenoid No. 8 of FIG. 8. Wiper member 130c of FIG. 7 connects powered contact elements 112a to contact elements 112m leading back to the first board and to line P39 of Solenoid No. 1 of FIG. 8. Wiper member 29a of FIG. 5 bridges grounded contact elements 88a to contact elements 88b, and through line 134c provides the current return path (REV −) to the contact elements 104k of the second board 98 of FIG. 6. The wiper members 126c, 126a and 126b couple the contact elements 104k to the lines 134e, 134f and 134 k and provide the ground path to Solenoid Nos. 1, 6 and 8 respectively.

Continuing in FIRST REVERSE, the wiper member 92c shown in FIG. 5 bridges electrical power available in contact elements 88g to contact element 88d. Contact element 88d is electrically connected to line P25 and to backup alarm 18f shown in FIG. 8. Therefore, in all of the reverse positions of the control member 25 the alarm is actuated to alert bystanders near the vehicle that it is backing up.

Again it can be appreciated that three power lines P39, P40 and P33 shown in FIG. 8, and three ground lines P9, P29 and P4 were positively coupled to engage Solenoid Nos. 1, 6 and 8 respectively. It is apparent that the remaining reverse or forward speed positions of the control member 25 will cause incremental rotation of the wiper holder 54 shown in FIG. 4, as is aided by the indexing means 114 or the positioning of the detent elements 118 into the desired detent grooves 120. And for each specific position thereof the rotatable wiper members in the series 126 and 130 connect both the power line side and the ground line side of at least one newly selected solenoid.

Referring now to the lower left portion of FIG. 6, the parking brake switch 135 remains closed in all positions of the control member 25 rearwardly of the forwardly located PARK position shown in FIG. 1. When, however, the control member is positioned forwardly in PARK the holder 54 physically abuts the switch 135 due to the rotation thereof and opens it. This is sufficient to cause the power in the line 134p and the line P26 serially connected to it in FIG. Nos. 5 and 8 to be cut off. The parking brake solenoid 18d is subsequently deenergized permitting a separate system, not shown, to automatically apply the vehicular parking brake.

Another optional component operated by the control mechanism 10 includes the variable horsepower solenoid 18g shown in FIG. 8. In the positions of the control member 25 above fourth gear forward or reverse, the variable horsepower solenoid is actuated. For example, in gear ratios at and above fourth gear the wiper member 126g shown in FIG. 6 is rotated in a counterclockwise manner from NEUTRAL sufficiently to connect contact elements 104e, and the accessory power available in the line 134i connected thereto, with contact elements 104d leading to line 134j. Line 134j is connected to line P15, and this enables the actuation of variable horsepower solenoid 18g shown in FIG. 8. Therefore, at elevated gear ratios or faster ground speeds the output horsepower of the vehicle engine or power plant, not shown, is automatically increased under certain conditions in response to the actuation of this solenoid.

It can be noted from the gear chart set forth earlier that Solenoid Nos. 2 and 3 are used only in FORWARD, and that Solenoid No. 1 is used only in REVERSE. These first three solenoids can be referred to as the directional solenoids. Solenoid Nos. 4 through 8 can be referred to as speed solenoids, and each one of these is used in FORWARD and REVERSE. Accordingly, logic for the instant embodiment transmission 12 has been provided so that at and above fourth gear the speed solenoids in the FORWARD mode and the speed solenoids in the REVERSE mode are not the same for the corresponding pivotal position of the control member 25 about the axis 44. When the control member is in FORWARD under these conditions, electrical power is not transferred generally to the left side of the third board 106 when viewing FIG. 7, and electrical ground is not available generally at the right side of the second board 98 when viewing FIG. 6. The current blocking diodes D9–D28 will not allow current to flow along the incorrect path to the wrong side of the respective printed circuit boards. When in REVERSE under these conditions the current blocking diodes prevent electrical power from being directed to the right side of the third board 106 and electrical ground from being connected to the left side of the second board 98.

The instant embodiment has been designed with versatility of electrical circuits and/or circuit board combinations in mind. While three printed circuit boards 86, 98 and 106 are used in the described embodiment, only the base or first printed circuit board 86 shown in FIG. 5 is required if the transmission controlled thereby has single forward and single reverse modes of operation. For a multi-speed transmission requiring only simple shift logic a second board would be connected to the first board 86; in such an instance the second board would preferably be divided into power and ground side portions and have the contact elements thereon that are associated with the circuits of the starting solenoid 18b and the key switch 18c. Also, such a second board would preferably be located in the position of the board 98 in FIG. 3 because it would be easily accessible upon removal of the end cap 48c. And, when relatively complex transmission logic is required with multiple accessories being involved, a third printed circuit board is preferably incorporated or connected electrically to the other two boards as is fully described herein.

In view of the foregoing, it can be appreciated that the electrical transmission control mechanism 10 includes a juxtaposed arrangement of a transmission control assembly 20 including a manually operated control member 25, and a horizontally and transversely oriented printed circuit board 86 that is swept by a wiper assembly 90 in a linear manner with transverse movement of the control knob 27. Preferably, one or two other printed circuit boards 98 and 106 are electrically connected to the first board 86 in an upstanding right angle relationship thereto and in parallel longitudinally oriented planes. The boards and the wiper members associated therewith are desirably contained in a sealed housing 48, and yet are conveniently serviceable by release of the end cap 48c as can be appreciated by reference to FIG. 3. Complex linkage is avoided and the expenses associated with microprocessors and programmable integrated circuits is avoided.

Other aspects, objects and advantages of this invention can be obtained from a study of the drawings, the disclosure and the appended claims.

I claim:

1. An electrical transmission control mechanism including electrical actuator means for selecting the direction of rotation and the gear ratio of the output of a multispeed transmission, and an electrical power source, comprising:
   a transmission control assembly including a manually actuated control member having an outer end portion, and support means for mounting the control member for pivotal movement about a transverse axis and for transverse movement of the outer end portion;
   a printed circuit board having a plurality of contact elements thereon that are electrically connected to the electrical actuator means and the power source;
   a wiper assembly having a plurality of wiper members connected thereto; and
   guide means for supporting the wiper assembly for linear travel transversely across the printed circuit board in response to transverse movement of the outer end portion of the control member and for controllably selecting the direction of rotation of the transmission by the wiper members bridging selected ones of the contact members.

2. The electrical transmission control mechanism of claim 1 including a second printed circuit board having a second plurality of contact elements, connecting means for electrically connecting the boards in a substantially right angle relationship, a holder having a second plurality of wiper members mounted thereon, and coupling means for causing rotation of the holder about the transverse axis in response to pivotal movement of the control member and selecting a gear ratio by causing the second plurality of wiper members to bridge selected ones of the second plurality of contact elements.

3. The electrical transmission control mechanism of claim 2 including a third printed circuit board having a third plurality of contact elements, second connecting means for electrically connecting the printed circuit board with the third printed circuit board, and wherein the holder includes a third plurality of wiper members to selectively bridge the third plurality of contact elements with rotation of the holder.

4. The electrical transmission control mechanism of claim 3 wherein the second printed circuit board provides the electrical power path to and from the printed circuit board, and the third printed circuit board provides the ground or return path to and from the printed circuit board.

5. The electrical transmission control mechanism of claim 4 including a plurality of one-way current blocking diodes mounted on both the and printed circuit boards.

6. The electrical transmission control mechanism of claim 5 wherein the actuator means includes a plurality of solenoids individually having a power side lead and a ground side lead, and including a plurality of surge protecting diodes mounted on the printed circuit board and individually bridging the leads of the solenoids.

7. The electrical transmission control mechanism of claim 1 wherein the transmission control assembly includes a lost-motion coupling connected between the control member and the wiper assembly.

8. The electrical transmission control mechanism of claim 7 wherein the control member has an inner end portion, and the lost-motion coupling includes an elongate ring defining a longitudinally oriented recess receiving the inner end portion therein.

9. The electrical transmission control mechanism of claim 8 wherein the support means includes a pivotal yoke for supporting the control member, a shaft for supporting the yoke along the axis, and a wiper holder connected to and limitedly rotatable with the pivotable yoke and the shaft in response to pivotal movement of the control member.

10. An electrical transmission control mechanism including a plurality of solenoids for controllably selecting one of a plurality of gear ratios and the direction of rotation of the output of a multispeed transmission and an electrical power source, comprising:
    a transmission control assembly including a control member having outer and inner end portions;
    support means for mounting the control member for limited rotation about a first axis and for limited pivotal movement about a second axis generally transverse to the first axis;
    first means for selecting one of the plurality of gear ratios by communicating electrical power to the selected ones of the solenoids in response to rotation of the control member about the first axis; and
    second means for controllably communicating power from the source to the first means and for selecting the direction of rotation of the transmission in response to movement of the inner end portion of the control member about the second axis.

11. The electrical transmission control mechanism of claim 10 wherein the second means includes a first printed circuit board having a plurality of contact elements thereon, and the first means includes a second printed circuit board having a second plurality of contact elements electrically connected to the first printed circuit board in a right angle relationship.

12. The electrical transmission control mechanism of claim 11 wherein the second means includes a power directing wiper assembly having a holder and a plurality of wiper members connected to the holder, the holder and the wiper members being transversely linearly movable across the contact elements of the first printed circuit board in response to lateral movement of the inner end portion of the control member.

13. The electrical transmission control mechanism of claim 12 wherein the first means includes a second holder and a second plurality of wiper members connected to the second holder, the second holder and the second plurality of wiper members being limitedly rotatable across the second plurality of contact elements in response to substantially longitudinal movement of the control member.

14. An electrical transmission control mechanism including a plurality of electrically operated actuators, an electrical power source, and an electrical ground, comprising:
- a transmission control assembly including a manually operated control member having an outer end portion, and support means for mounting the control member for pivotal movement about a transverse axis and for transverse movement of the outer end portion;
- printed circuit board means for engaging selected ones of the actuators, the printed circuit board means including a plurality of contact elements connected to the power source, the ground and the actuators;
- first wiper means for bridging selected ones of the contact elements in response to transverse movement of the outer end portion of the control member and for selecting the direction of rotation of the transmission; and
- second wiper means for bridging other selected ones of the contact elements in response to pivotal movement of the control member about the axis and for selecting the gear ratio of the transmission.

15. The electrical transmission control mechanism of claim 14 wherein the printed circuit board means includes a first printed circuit board positioned to be swept by the first wiper means and a second printed circuit board electrically connected to the first printed circuit board and positioned to be swept by the second wiper means.

16. The electrical transmission control mechanism of claim 15 wherein the printed circuit board means includes a third printed circuit board electrically connected to the first printed circuit board and positioned to be swept by the second wiper means.

17. The electrical transmission control mechanism of claim 16 wherein the second printed circuit board provides the electrical power path to and from the first printed circuit board and the third printed circuit board provides the return path or ground to and from the first printed circuit board.

18. The electrical transmission control mechanism of claim 17 wherein the second and third printed circuit boards have mounted thereon a plurality of one-way current blocking diodes.

19. An electrical transmission control mechanism including a plurality of solenoids for controllably selecting one of a plurality of gear ratios and the direction of rotation of the output of a multispeed transmission, comprising:
- a transmission control assembly including a control member having outer and inner end portions;
- coupling means for mounting the control member on a shaft for limited rotation about an axis and permitting the inner end portion of the control member to move longitudinally, and permitting the inner end portion to move laterally with lateral movement of the control member;
- a first printed circuit board having a first plurality of contact elements associated therewith;
- first wiper means for contacting selected ones of the first plurality of contact elements in response to longitudinal movement of the control member and rotation of the shaft and for selecting one of the plurality of gear ratios;
- a second printed circuit board having a second plurality of contact elements; and
- second wiper means for contacting selected ones of the second plurality of contact elements in response to lateral movement of the inner end portion of the control member and for selecting the direction of rotation of the output of the transmission.

20. An electrical transmission control mechanism including a plurality of actuators for controllably selecting one of a plurality of gear ratios and the direction of rotation of the output of a multispeed transmission, comprising:
- a transmission control assembly including a control member;
- support means for mounting the control member for limited rotation about a central axis and for limited pivotal movement about a second axis transverse to the central axis;
- a first printed circuit board having a first plurality of contact elements thereon;
- a second printed circuit board having a second plurality of contact elements thereon electrically connected to the first printed circuit board;
- first wiper means for bridging selected ones of the first plurality of contact elements in response to lateral movement of the control member; and
- second wiper for bridging selected ones of the second plurality of contact elements in response to longitudinal movement of the control member.

* * * * *